United States Patent [19]

Schimmel et al.

[11] 4,126,596

[45] Nov. 21, 1978

[54] TWO PACKAGE POLYMERIC EPOXY COMPOSITIONS HAVING IMPROVED POTLIFE

[75] Inventors: Karl F. Schimmel, Verona; James A. Claar, Export; Jerome A. Seiner, Pittsburgh; Marco Wismer, Gibsonia, all of Pa.

[73] Assignee: PPG Industries, Inc., Pittsburgh, Pa.

[21] Appl. No.: 771,276

[22] Filed: Feb. 23, 1977

[51] Int. Cl.$^2$ .................. C08L 33/02; C08L 63/02
[52] U.S. Cl. .................. 260/29.6 NR; 260/836; 260/837 R; 428/418; 428/463
[58] Field of Search ............ 260/837 R, 836, 29.2 EP, 260/29.6 NR; 252/188.3 R

[56] References Cited

U.S. PATENT DOCUMENTS

| 3,494,847 | 2/1970 | Yurcheshen | 204/181 |
| 3,719,629 | 3/1973 | Martin et al. | 260/29.6 NR |
| 3,945,963 | 3/1976 | Levine et al. | 260/29.6 NR |

FOREIGN PATENT DOCUMENTS 1,293,529 10/1972 United Kingdom.

Primary Examiner—Theodore E. Pertilla
Attorney, Agent, or Firm—Charles R. Wilson

[57] ABSTRACT

Two-package polymeric compositions which form cured products having excellent stain and solvent resistance and having improved potlife comprise a polyepoxide and an addition interpolymer containing pendent salt groups formed by reacting carboxyl groups with a hindered amine and pendent amine groups formed by reacting carboxyl groups with an alkylenimine. The addition interpolymer when mixed with the polyepoxide reacts to form a cured, hard, stain and solvent resistant material. The stability of the mixed compositions, i.e., its potlife, is lengthened by utilizing a sterically-hindered tertiary amine to form the salt groups of the interpolymer. Stability of the addition interpolymer prior to mixing is improved by utilizing therein monomers which provide aminolysis-resistant groups in the interpolymer.

20 Claims, No Drawings

TWO PACKAGE POLYMERIC EPOXY COMPOSITIONS HAVING IMPROVED POTLIFE

BACKGROUND OF THE INVENTION

Certain water-thinnable coating compositions composed of acidified addition copolymers containing pendent carboxyl groups and pendent aminoester groups formed by aminoethylating pendent carboxyl groups with an excess of alkylenimine and epoxy resins are known as shown by U.S. Pat. No. 3,719,629 to Martin et al, issued Mar. 7, 1973. These acidified copolymers are cationic acid salts, i.e., the salt groups are provided by reacting basic groups with an acid. This creates a number of serious disadvantages. For example, because of the cationic nature of the copolymer, it cannot be readily formulated into a coating composition by blending it with the conventional anionic modifiers normally employed in coating compositions, acid sensitive pigments such as the carbonates cannot readily be employed, and the conventional anionic pigment dispersants cannot be utilized in the usual manner. Another disadvantage, due to the fact that the copolymer product is an acid salt, is that it cannot be satisfactorily employed as a coating material for unprimed metal substrates since such acid salts usually cause flash rusting.

Water-based coating compositions containing basic salts of polycarboxylic acid resins containing amine groups formed by iminating a portion of the carboxyl groups are shown by U.S. Pat. No. 3,494,847 issued to Yurcheson et al on Feb. 10, 1970. The coating compositions disclosed in U.S. Pat. No. 3,494,847 generally utilize as the polycarboxylic acid resin certain fatty acid adducts containing unsaturation for curing, but in some cases interpolymers of acrylic and other vinyl monomers, at least one of which contains a hydroxyl group, are contemplated. In such cases, the interpolymer is cured with an amine-aldehyde condensate to which may be added a polyepoxide.

U.S. Pat. No. 3,945,963, issued to Levine et al on Mar. 23, 1976, described emulsions of acrylic interpolymers in combination with certain resins derived from epoxides. These resins are either very high molecular weight (above 20,000) or defunctionalized (and thus not a polyepoxide) by reaction of the epoxy groups, such high molecular weight or defunctionalization being necessary in order to provide the one-package compositions contemplated.

In addition to the foregoing disadvantages, water-thinnable and water-based compositions of the type disclosed in the aforementioned patents possess additional disadvantages. Thus, compositions of the type described in U.S. Pat. No. 3,494,847 and 3,719,629 usually have a relatively short potlife, i.e., they react to a viscous, unusable state within a short time after the copolymer and epoxy resin components are mixed together. The potlife of such mixed compositions generally ranges from less than one hour to a few hours. Moreover, the amine group-containing copolymer components of the patented compositions are also usually deficient in stability, particularly when stored at elevated temperatures (e.g., 200° F. or above), often becoming unusable in from less than one day to a few days.

SUMMARY OF THE INVENTION

In accordance with this invention, polymeric compositions are provided which substantially minimize the aforementioned disadvantages. The polymeric compositions are two-package compositions which when interreacted form crosslinked, hard, solvent and stain-resistant materials. The co-curable resinous components of these polymeric compositions consist essentially of a polyepoxide and an addition interpolymer which contains a polymeric backbone formed from at least two ethylenically-unsaturated monomers, at least one of which contains carboxyl groups, pendent amine groups formed by reacting a part of the carboxyl groups with an alkylenimine, and pendent anionic salt groups formed by reacting a part of the carboxyl groups with a base. The improved stability of the mixed compositions, i.e., potlife, is provided by utilizing a sterically-hindered tertiary amine to form the salt groups of the interpolymer. The stability of the addition interpolymer component (prior to mixing) is improved by utilizing therein monomers which provide aminolysis-resistant organic groups.

The polymeric compositions can be made to be thinned or reduced with organic solvents, water or mixtures thereof. In the preferred embodiments of the invention, either or both of the resinous components are in a solvent medium composed predominantly of water.

The polymeric compositions of the invention form cured products having excellent stain and solvent resistance and are useful in various coating, casting and molding application but are particularly suitable for use as protective and decorative coatings.

DETAILED DESCRIPTION OF THE INVENTION

A wide variety of polyepoxides may be utilized in the compositions of this invention, but in order to provide the cured products desired, the polyepoxide should have a 1,2-epoxy equivalence greater than 1.0, that is, in which the average number of 1,2-epoxy groups per molecule is greater than 1, and be of low molecular weight, i.e., below about 4000, preferably below about 2000. The polyepoxide can be any of the well-known epoxides, such as, for example, those described in U.S. Pat. Nos. 2,467,171; 2,615,007; 2,716,123; 3,030,336; 3,053,855 and 3,075,999. A useful and preferred class of polyepoxides are the polyglycidyl ethers of polyphenols, such as Bisphenol A, produced, for example, by etherification of a polyphenol with epichlorohydrin or dichlorohydrin in the presence of an alkali. The phenolic compound may be bis(4-hydroxyphenol)-2,2-propane, 4,4'-dihydroxybenzophenone, bis(4-hydroxyphenyl)1,1-ethane, bis(4-hydroxyphenyl)1,1-isobutane; bis(4-hdyroxy-tertiary-butylphenyl)2,2-propane, bis(2-hydroxynaphthyl)methane, 1,5-dihydroxy-napthalene, or the like. Another quite useful class of polyepoxides are produced similarly from Novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, bis(4-hydroxycyclohexyl)-2,2-propane, and the like.

There can also be used polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, terephthalic acid, 2,6-naphthylene dicarboxylic acid, dimerized linolenic acid and the like. Examples are diglycidyl adipate and diglycidyl phthalate.

In addition, polyepoxides derived from the epoxidation of an olefinically unsaturated alicyclic compound may also be employed. Included are diepoxides comprising in part one or more monoepoxides. These polyepoxides are non-phenolic and are obtained by epoxidation of alicyclic olefins, for example, by oxygen and selected metal catalysts, by perbenzoic acid, by acetaldehyde monoperacetate, or by peracetic acid. Among such polyepoxides are the epoxyalicyclic ethers and esters, which are well known in the art.

Another class of polyepoxides which may be employed are those containing oxyalkylene groups in the epoxy molecule. Polyepoxides containing oxyalkylene groups can be produced by reacting some of the epoxy groups of a polyepoxide, such as the polyepoxides mentioned above, with a monohydric alcohol containing oxyalkylene groups.

Other epoxy-containing compounds and resins which may be employed include nitrogeneous diepoxides, such as disclosed in U.S. Pat. Nos. 3,365,471; epoxy resins from 1,1-methylene bis(5-substituted hydantoin), No. 3,391,097; bis-imide containing diepoxides, 3,450,711; heterocyclic N,N'-diglycidyl compounds, 3,503,979; amino epoxyphosphonates, British Pat. No. 1,172,916; 1,3,5-triglycidyl isocyanurates, and the like.

The amounts of polyepoxide included in the compositions of the invention should be sufficient to provide a crosslinked product upon interreaction with the addition interpolymer but may vary considerably, depending upon desired properties. Usually from about 5 to about 95 percent by weight of the polyepoxide, based upon the combined weight solids of the addition interpolymer and polyepoxide may be employed, with a preferred amount being from about 25 to about 75 percent by weight.

As indicated above, the other essential component of the polymeric compositions of the invention is an addition interpolymer containing carboxyl groups, at least part of which are reacted with an alkylenimine and part with a base.

The addition interpolymer component of the polymeric compositions of the invention is prepared by interpolymerizing at least two polymerizable ethylenically-unsaturated monomers, at least one containing carboxyl groups, i.e., an unsaturated carboxylic acid, to form an addition interpolymer containing carboxyl groups, following which a portion of the carboxyl groups of the interpolymer are reacted with an alkylenimine to form pendent amine groups and a portion of the carboxyl groups of the interpolymer are neutralized with a basic compound to form pendent salt groups. There may or may not remain unreacted carboxyl groups in the interpolymer but, in any event, the number of salt groups therein should be sufficient to provide the desired viscosity and solubility characteristics. Ordinarily the number of salt groups is sufficient so that the addition interpolymer has a pH in water of greater than about 6 and, preferably, greater than 7.

Polymerizable ethylenically unsaturated carboxylic acids which may be employed in forming the interpolymer include, alpha, beta-ethylenically unsaturated monocarboxylic acids, such as acrylic acid, methacrylic acid, cinnamic acid, and the like; unsaturated dicarboxylic acids such as maleic acid, fumaric acid, itaconic acid and the like; and half esters of unsaturated dicarboxylic acids such as t-butyl hydrogen maleate, isopropyl hydrogen fumarate and the like. It should be noted that when acids are referred to above, the anhydrides of such acids, where they exist, may also be utilized. In addition, mixtures of the foregoing acids (or anhydrides) may be employed. The preferred ethylenically unsaturated carboxylic acids herein are the alpha, beta-ethylenically unsaturated monocarboxylic acids and, of these, acrylic and methacrylic acids are especially preferred.

The unsaturated carboxylic acid monomer comprises usually from about 5 to about 60, preferably from 10 to 50, percent by weight of the addition interpolymer.

The other monomer or monomers which may be employed in forming the interpolymer include essentially any copolymerizable monomer. Examples are esters of unsaturated acids, such as those mentioned above, especially alkyl acrylates and methacrylates; unsaturated esters of organic and inorganic acids, such as vinyl halides, vinylidene halides, vinyl acetate, dialkyl maleates, allyl chloride and the like; monoolefinic and diolefinic hydrocarbons such as styrene, alpha-methyl styrene, the halo-substituted styrenes, vinyl toluene, vinyl naphthalene, allyl alcohol, 1,3-butadiene, 2-chlorobutene, isoprene and the like; and unsaturated amides (unsubstituted or substituted), such as acrylamide, methacrylamide, diacetone acrylamide, crotonamide, N-(methoxymethyl)acrylamide, N-(propoxymethyl)acrylamide, N-(butoxymethyl)acrylamide, N-(butoxymethyl)methacrylamide, N-methylol acrylamide and the like. The specific monomers chosen and their proportions will depend upon the properties desired and their reactivity with each other and the acid monomer, using considerations well known in the art.

It is preferred to employ, in addition to the acid monomer, one or more monomers which provide aminolysis-resistant organic groups in the interpolymer. The inclusion of these imparts improved stability to the interpolymer, particularly upon storage (prior to mixing with the polyepoxide). As discussed in copending application Ser. No. 771,134, filed on an even date herewith and incorporated herein by reference, the lower than desirable stability of amine group-containing addition interpolymers, particularly at elevated temperatures, is caused at least to a major degree by internal aminolysis reactions which occur between pendent amine groups and pendent ester groups formed from certain conventionally employed esters of acrylic and methacrylic acids such as, for example, methyl acrylate, ethyl acrylate, butyl acrylate, methyl methacrylate, etc. As described in the copending application, the aminolysis reaction occurs when the pendent amine groups of one polymer chain and the pendent ester groups of another polymer chain react to form an amide; this reaction causing crosslinking between polymer chains, which in turn leads to increasing molecular weight and eventual gellation of the interpolymer. The term "aminolysis resistant", as employed throughout this specification and claims, refers to organic groups or compounds which resist or impede the formation of amide groups.

Polymerizable ethylenically-unsaturated aminolysis resistant organic monomers which can be employed in forming the interpolymer include certain monoolefinic and diolefinic hydrocarbons, unsaturated carboxylic acid amides (substituted or unsubstituted), unsaturated organonitriles, and certain esters of alpha, alkyl-substituted carboxylic acids. Mixtures of such aminolysis resistant organic monomers can also be utilized. The preferred aminolysis resistant organic monomers are esters, and particularly sterically hindered, branched-chain and alicyclic esters, of alpha, alkyl-substituted carboxylic acids.

Aminolysis resistant monoolefinic and diolefinic hydrocarbon monomers, which can be employed include styrene, alpha-methyl styrene, the halo-substituted styrenes, vinyl toluene, vinyl naphthalene, allyl alcohol, butadiene, isoprene and similar compounds. The preferred aminolysis resistant hydrocarbon monomers are the vinyl aromatic hydrocarbons and, of these, styrene, alpha-methylstyrene and vinyl toluene are especially preferred.

Aminolysis resistant unsaturated carboxylic acid amides which can be employed include both unsubstituted and substituted amides. Thus, there can be employed unsubstituted amides, such as acrylamide, methacrylamide, crotonamide and the like; N-alkoxyalkyl-substituted amides, such as N-(methoxymethyl)acrylamide, N-(propoxymethyl)acrylamide, N-(isopropoxymethyl)acrylamide,-N-(butoxymethyl)acrylamide, N-(butoxymethyl)methacrylamide and the like; and methylolated amides, such as N-methylolacrylamide and the like. Mixtures of such amides may also be utilized. The preferred aminolysis resistant amides are the N-alkoxyalkyl-substituted amides and, of these, N-(butoxymethyl)acrylamide is especially preferred.

Aminolysis resistant unsaturated organonitriles include acrylonitrile, methacrylonitrile, and the like.

As indicated above, the preferred ethylenically-unsaturated aminolysis resistant organic monomers for use in forming the interpolymer component of this invention are esters of alpha, alkyl-substituted carboxylic acids. These aminolysis resistant esters are preferably esters of methacrylic acid and include ethyl methacrylate, isopropyl methacrylate, butyl methacrylate, isobutyl methacrylate, tertiary butyl methacrylate, isobornyl methacrylate and cyclohexyl methacrylate. Mixtures of such monomers can also be utilized. Often preferred are sterically-hindered branched chain and alicyclic esters, and an especially preferred aminolysis resistant ester is isobutyl methacrylate.

The preferred addition interpolymers containing carboxyl groups and aminolysis resistant organic groups can be prepared by interpolymerizing from about 5 to about 60, preferably from 10 to 50, percent by weight of such ethylenically unsaturated carboxylic acid monomers and from about 40 to about 95, preferably from 50 to 90, percent by weight of such ethylenically unsaturated aminolysis resistant organic monomers. However, in some cases highly satisfactory products can be obtained using combinations of certain aminolysis resistant monomers and certain non-aminolysis resistant monomers.

The addition interpolymer is prepared by interpolymerizing the polymerizable ethylenically-unsaturated monomers utilizing conventional vinyl addition solution polymerization techniques and procedures. Thus, the monomer mixture is ordinarily polymerized in an organic solvent or organic solvent solution in which the monomers are soluble and in the presence of a suitable vinyl polymerization catalyst, usually under controlled elevated temperatures with agitation until the polymerization reaction is complete. Various modifications commonly practiced in solution polymerization reactions, such as stepwise addition of the monomer mixture during polymerization, incremental addition of catalyst, polymerization under an inert atmosphere, continuous or batch polymerization and the like may be employed. The details of such polymerizations are well known.

In polymerizing the monomers, virtually any of the organic solvents heretofore employed in preparing acrylic interpolymers may be utilized. Thus, alcohols such as propanol, butanol, or other lower alkanols; ketones such as methyl ethyl ketone, methyl n-butyl ketone, and the like, and aromatic hydrocarbons such as xylene, toluene and the like, as well as mixtures of such solvents, may be employed. If it is desired to prepare an ultimate interpolymer product which is intended to be dissolved in or thinned with water, it is often preferred to employ water-soluble or water-miscible organic solvents in the polymerization reaction. Suitable solvents of this type include ether type alcohols, such as, for example, ethylene glycol monobutyl ether, ethylene glycol monoethyl ether, diethylene glycol monoethyl ether, propylene glycol monomethyl ether, dipropylene glycol monomethyl ether, and the like; and lower alkanols having 2 to 4 carbon atoms such as ethanol, propanol, isopropanol, butanol, and the like, or mixtures of these solvents. Mixtures of the above water-soluble or water-miscible organic solvents and water can also be advantageously used as the solvent medium in the polymerization reaction.

The preferred catalysts are azo compounds, such as, for example, alpha, alpha'-azobisisobutyronitrile; peroxides such as benzoyl peroxide and cumene peroxide and cumene hydroxy peroxide, tertiary butyl perbenzoate, and tertiary butyl peracetate. Other useful catalysts include tertiary butyl pivalate, isopropyl percarbonate, butyl peroxy isopropyl carbonate and similar compounds. The quantity of catalyst employed may be varied considerably; however, in most instances it is desirable to utilize from about 0.1 to about 8.0 percent by weight, based on monomer solids.

If interpolymers of relatively low molecular weight are desired, a chain-modifying agent or chain transfer agent is ordinarily added to the polymerization mixtures. The mercaptans, such as dodecul mercaptan, tertiary dodecyl mercaptan, octyl mercaptan, hexyl mercaptan, and the like, are conventionally used for this purpose.

In the polymerization of the monomers, the polymerization temperature can range from about 25° C. to about 280° C., preferably 90° C. to 150° C. The specific temperature employed can vary considerably, depending on the specific monomers employed, the use of catalysts and other conditions.

The addition interpolymer is reacted with an alkylenimine or substituted alkylenimine in sufficient amount to iminate a portion of the carboxyl groups to from pendent amine groups and a portion of the carboxyl groups of the interpolymer are neutralized with a basic compound to form pendent salt groups, thereby producing an interpolymer product containing pendent salt groups and pendent amine (or amino-ester) groups.

The term "iminate" as employed throughout this specification and claims means to react an amine, i.e., an alkylenimine or substituted alkylenimine with a carboxyl group. Thus, an iminated interpolymer refers to an interpolymer in which the carboxyl groups thereof have been reacted or partially reacted with an amine. In addition, the term "imination" refers to the process of reacting an interpolymer containing carboxyl groups with an imine.

The specific order of reaction as between imination and neutralization is not usually critical. Thus, the neutralization reaction with the basic compound is usually carried out after the imination but may be partly or wholly carried out prior to imination or simultaneously therewith. Moreover, as further discussed below, it is often preferred to conduct the neutralization in stages.

Alkylenimines (which term includes substituted alkylenimines) which may be employed in the imination reaction include imines such as those of the formula:

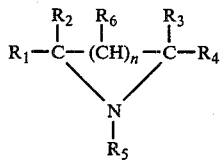

where $R_1$, $R_2$, $R_3$, $R_4$ and $R_5$ are each hydrogen; alkyl, such as methyl, ethyl, propyl, or the like, having, for example, up to about 20 carbon atoms; aryl such as phenyl or the like; alkaryl, such as tolyl, xylyl or the like; or aralkyl, such as benzyl, phenethyl, or the like. $R_6$ in the above formula is hydrogen or a lower alkyl radical, usually having not more than about 6 carbon atoms and $n$ is an integer from 0 to 1, preferably 0. Substituted radicals of the classes indicated are included where the substituent groups do not adversely affect the basic nature of the imine in the reaction. Such substituents may include groups such as cyano, halo, amino, hydroxy, alkoxy and carbalkoxy. The substituted groups may thus be cyanoalkyl, haloalkyl, aminoalkyl, hydroxylalkyl, alkoxyalkyl, carbalkoxyalkyl and similar substituted derivatives of aryl, alkaryl and aralkyl groups where present.

It will be recognized by those skilled in the art that compounds containing certain combinations of the above groups cannot be obtained, for example, because of factors such as steric-hindrance or intra-molecular interaction. For this reason, in most of the compounds of the class described, several of the groups designated by $R_1$ through $R_6$ represent hydrogen. However, the efficacy of the various alkylenimines (whether or not within the above formula) does not depend upon the particular nature of any of the substituents, but rather the imine linkage.

Illustrative examples of suitable alkylenimines (i.e., aziridines) falling within the scope of the above formula include ethylenimine (aziridine), 1,2-propylenimine(2-methyl aziridine), 1,3-propylenimine (azetidine), 1,2-dodecylenimine (2-decyl aziridine), 1,1-dimethyl ethylenimine (2,2-dimethyl aziridine), phenyl ethylenimine (2-phenyl aziridine), tolyl ethylenimine [2-(4-methylphenyl)aziridine], benzyl ethylenimine (2-phenylmethyl aziridine), 1,2-diphenyl ethylenimine (2,3diphenyl aziridine), hydroxyethyl ethylenimine ]2-(2-hydroxyethyl)aziridine), aminoethyl ethylenimine [2-(2-aminoethyl)aziridine], 2-methyl propylenimine (2-methyl azetidine), 3-chloropropyl ethylenimine [2-(3-chloropropyl)aziridine], p-chlorophenyl ethylenimine [2-(4-chlorophenyl)aziridine], methoxyethyl ethylenimine [2-(2-methoxyethyl)aziridine], dodecyl aziridinyl formate (dodecyl 1-aziridinyl carboxylate), N-ethyl ethylenimine (1-ethyl aziridine), N-butyl ethylenimine (1-butyl aziridine, N-(2-hydroxyethyl)ethylenimine [1-(2-hydroxyethyl)aziridine] and the like.

Because of their availability and because they have been found to be among the most effective, the preferred imines are alkylenimines having 2 to 4 carbon atoms, and especially ethylenimine, 1,2-propylenimine and N-hydroxyethyl ethylenimine.

The amounts of alkylenimine employed in the imination reaction can be varied considerably, depending on desired properties and the proportion of acid monomer moities in the addition interpolymer. In general, an amount of alkylenimine sufficient to iminate from about 5 mole percent to about 95 mole percent of the carboxylic acid groups of the interpolymer may be employed. However, it is preferred, in most instances, to iminate from about 15 mole percent to about 50 mole percent of the carboxylic acid groups.

As mentioned heretofore, in forming the addition interpolymer component of the compositions of the invention, a portion of the carboxyl groups of the interpolymer are neutralized with a sterically-hindered tertiary amine having the structure:

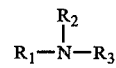

wherein $R_1$, $R_2$ and $R_3$ are each aliphatic or cycloaliphatic radicals having from 2 to 10 carbon atoms.

Illustrative of the particularly preferred sterically-hindered tertiary amines which may be employed are diethylethanolamine, N-ethyl morpholine, triethylamine, triethanolamine, diisopropylethanolamine, triisopropanolamine, tripropylamine, ethyldiethanolamine, and like compounds. The specific preferred amine is diethylethanolamine.

The use of these hindered amines unexpectedly and surprisingly have been found to enhance the potlife of the mixed polymeric compositions of this invention. Thus, it has been found that compositions in which the salt groups of the addition interpolymer are formed by neutralization with the preferred basic compounds exhibit potlives which are greatly improved over compositions in which the salt groups of the addition interpolymer are formed with other basic compounds.

The amount of hindered amine employed for neutralization purposes may vary considerably, depending upon factors such as the amount of acid included in the interpolymer, the specific amine utilized, the identity and amount of alkylenimine used, and so forth. The specific amine and amount utilized is selected such that after reaction with the desired amount of alkylenimine, the addition interpolymer salt has the desired viscosity and solubility and the desired pH in water. For example, in the preferred coating composition embodiments the level of neutralization is sufficient so that the product is thinnable or reducible with water. When water is not to be present, e.g., the interpolymer is in organic solvents, the level of neutralization is sufficient to provide a product of workable and stable viscosity.

While usually the imination reaction precedes the neutralization step, it is often advantageous and in some instances preferred to conduct the neutralization in more than one stage. Thus, more efficient processing is often achieved by partially neutralizing the carboxyl groups of the interpolymer with the hindered amine prior to the imination step and then completing the remainder of the neutralization procedure after the imination step.

In addition to the polyepoxide and addition interpolymer components, the compositions of the invention may contain various other optional additives, including pigments and dyes of the type ordinarily utilized, fillers, plasticizers, antioxidants, flow control agents, surfactants, thickeners and other such formulating additives.

The compositions of the invention may be employed in various casting, molding and coating applications, but are especially useful in coating applications, particularly those requiring a high level of stain and solvent resistance. Thus, for example, the compositions herein are especially useful as coatings for hospital walls, operating rooms and the like. The coating compositions can be applied by any conventional method, including brushing, dipping, flow coating, roll coatings, spraying and the like. Conventional spray techniques and equipment can be utilized.

The polymeric compositions of the invention may be cured by baking at moderate or elevated temperatures, if desired. However, one especially advantageous property of the curable compositions is that they cure in air at ambient temperature without the use of heat. As will be evident, ambient temperature curable compositions are of considerable advantage in that they provide for significant energy savings in comparison to compositions which require elevated temperature for curing.

The following examples are submitted for the purpose of further illustrating the nature of the present invention and should not be construed as a limitation on the scope thereof. All parts and percentages in the examples and throughout the specification are by weight unless otherwise indicated.

EXAMPLE 1

Into a reactor equipped with a stirrer, thermometer, nitrogen inlet, dropping funnel and a condenser fitted with a water trap was charged 270.2 grams of propylene glycol monoethyl ether. The contents of the reactor were heated to 120° C. and a mixture consisting of 288.6 grams of isobornyl methacrylate, 123.7 grams of methacrylic acid, 12.4 grams of isooctyl thioglycolate, and 23.5 grams of tertiary butyl peracetate was added over a 2-hour period. The reaction mixture was then held at temperature for one hour. (Based on monomer solids, the monomer charge consisted of 70 percent isobornyl methacrylate and 30 percent methacrylic acid.) After the hold period, 2.4 grams of tertiary butyl peracetate and 12.1 grams of propylene glycol monomethyl ether were added to the reactor over a 30 minute period and the mixture then held at a temperature for one hour. Than, 124.9 grams of propylene glycol monomethyl ether were added, followed by 50.0 grams of diethylethanolamine. The reaction mixture was then cooled to 39° C. After cooling, 24.6 grams of propylenimine were added to the reactor and the reaction mixture then held at temperature for two hours. Following this hold period, 67.8 grams of diethylethanolamine were added to the reactor.

The resultant addition interpolymer solution had a solids content measured at 150° C. of 51.7 percent, a Gardner-Holdt viscosity of Z-7, and a Gardner color of 12.

To 20.0 grams of this addition interpolymer solution were added 10.7 grams of Epon 828, an epoxy resin of epichlorohydrin-Bisphenol A having an epoxide equivalent of 185-192 and a viscosity as measured by ASTM D-445 of 100-160 poises, available from Shell Chemical Company.

The resultant polymeric composition was drawn down on a metal panel using a 3-mil Bird Bar. The coated panel was then permitted to air dry at ambient temperature for 24 hours and then was placed in a 140° F. room for an additional 24 hours.

The cure and solvent resistance of the coatings were evaluated utilizing the well-known acetone resistance test in which a cloth impregnated with acetone is rubbed across the surface of the film and the number of rubs needed to remove the film from the substrate is reported. The coating of this example resisted over 100 acetone rubs without any film loss or softening indicating excellent cure and solvent resistance.

EXAMPLE 2

Into a reactor equipped as in Example 1 was charged 270.2 grams of propylene glycol monoethyl ether. The contents of the reactor was heated to 120° C. and a mixture consisting of 288.6 grams of cyclohexyl methacrylate, 123.7 grams of methacrylic acid, 12.4 grams of isooctyl thioglycolate, and 23.5 grams of tertiary butyl peracetate was added over a two-hour period. The reaction mixture was then held at temperature for one hour. (Based on monomer solids, the monomer charge consisted of 70 percent cyclohexyl methacrylate and 30 percent methacrylic acid.) After the hold period, 2.4 grams of tertiary butyl peracetate and 12.1 grams of propylene glycol monomethyl ether were added to the reactor over a 30 minute period and the mixture then held at temperature for one hour. Then, 124.9 grams of propylene glycol monomethyl ether were added, followed by 50.0 grams of diethylethanolamine. The reaction mixture was then cooled to 39° C. After cooling, 24.6 grams of propylenimine were added to the reactor and the reaction mixture held at temperature for two hours. Following this hold period, 67.8 grams of diethylethanolamine were added to the reactor.

The resultant addition interpolymer solution had a solids content measured at 150° C. of 51.7 percent, a Gardner-Holdt viscosity of Z-8 and a Gardner color of 5.

To 20.0 grams of this addition interpolymer solution were added 10.34 grams of Epon 828.

The resultant polymeric composition was drawn down, cured and tested for cure through and solvent resistance as in Example 1. The coating of this example resisted of 100 acetone rubs without film loss or softening, indicating excellent cure and solvent resistance.

EXAMPLE 3

Into a reactor equipped as in Example 1 was charged 270.2 grams of propylene glycol monoethyl ether. The contents of the reactor were heated to 120° C. and a mixture consisting of 288.6 grams of 2-ethylhexyl methacrylate, 123.7 grams of methacrylic acid, 12.4 grams of isooctyl thioglycolate, and 23.5 grams of tertiary butyl peracetate was added over a two-hour period. The reaction mixture was then held at temperature for one hour. (Based on monomer solids, the monomer charge consisted of 70 percent 2-ethylhexyl methacrylate and 30 percent methacrylic acid.) After the hold period, 2.4 grams of tertiary butyl peracetate and 12.1 grams of propylene glycol monomethyl ether were added to the reactor over a 30 minute period and the mixture then held at temperature for one hour. Then, 124.9 grams of propylene glycol monomethyl ether were added followed by 50.0 grams of diethylethanolamine. The reaction mixture was then cooled to 39° C. After cooling, 24.6 grams of propylenimine were added to the reactor and the reaction mixture then held at temperature for two hours. Following this hold period, 67.8 grams of diethylethanolamine were added to the reactor.

The resultant addition interpolymer solution had a solids content measured at 150° C. of 51.7 percent, a Gardner-Holdt viscosity of Z-5 and a Gardner color of 3.

To 20.0 grams of the addition interpolymer solution were added 9.24 grams of Epon 828.

The resultant polymeric composition was drawn down, cured and tested for cure through and solvent resistance as in Example 1. The coating of this example resisted over 100 acetone rubs without film loss or softening, indicating excellent cure and solvent resistance.

The following examples further illustrate the preparation of addition interpolymer components containing salt groups formed from sterically-hindered tertiary amines and compares them to non-hindered amines.

EXAMPLES 4-8

An addition interpolymer ("Interpolymer A") was prepared without imination and neutralization to serve as a base interpolymer for the preparation of addition interpolymer salts, as follows:

Into a reactor equipped as in Example 1 was charged 2624.0 grams of propylene glycol monomethyl ether. The contents of the reactor were heated to 118° C. and a mixture consisting of 3365.7 grams of isobutyl methacrylate, 1442.3 grams of methacrylic acid, 144.3 grams of isooctyl thioglycolate, 273.8 grams of tertiary butyl peracetate and 524.8 grams of propylene glycol monomethyl ether was added over a two-hour period (based on monomer solids, the charge contains 70 percent isobutyl methacrylate and 30 percent methacrylate acid). Then 28.0 grams of tertiary butyl peracetate and 23.6 grams of propylene glycol monomethyl ether were added over a 30-minute period. Following this addition, 1573.5 grams of propylene glycol monomethyl ether were added to the reactor over a 30-minute period. The resultant addition interpolymer solution (Interpolymer A) had a solids content measured at 150° C. of 52.3 percent, a Gardner-Holdt viscosity of Z2-Z3 and a Gardner color of 1.

Interpolymer salts were prepared from Interpolymer A in the following manner:

Salt B: Into a 2 liter flask was charged 1000 grams of Interpolymer A and 29.0 grams of propylenimine. The contents of the flask were held for 2 hours with stirring. Following this period, 94.1 grams of pyridine were added to the flask. The resultant Salt B had a solids content as measured at 150° C. of 49.8 percent.

Salt C: Into a 2 liter flask was charged 1000.0 grams of Interpolymer A and 29.0 grams of propylenimine. The contents of the flask were then held for 2 hours with stirring. Then 137.1 grams of N-ethyl morpholine were added to the flask with stirring. The resultant Salt C had a solids content as measured at 150° C. of 50.9 percent.

Salt D: Into a 2 liter flask was charged 1000.0 grams of Interpolymer A and 29.0 grams of propylenimine. The contents of the flask were held for 2 hours with stirring at 55° C. Then 143.0 grams of N-methyl diethanolamine were added to the flask with stirring. The resultant Salt D had a solids content as measured at 150° C. of 55.1 percent and a Gardner-Holdt viscosity of Z-8.

Salt E: Into a 2 liter flask was charged 1000.0 grams of Interpolymer A and 29.0 grams of propylenimine. The contents of the flask were then held for two hours with stirring. Following this period, 121.0 grams of N-methyl morpholine were added to the flask with stirring. The resultant Salt E had a solids content, as measured at 150° C, of 51.2 percent, a Gardner-Holdt viscosity of Z-10 and a Gardner color of 2.

To illustrate the effect of the addition interpolymer salt component on the potlife of the polymeric compositions, the addition interpolymer salts of Example 1 and Salts B, C, D and E each were blended with an epoxy resin and other composition additives to form finished compositions. The finished compositions were then evaluated for potlife at room temperature by measuring the changes in viscosity and observing the solubility of the compositions at various time periods. The compositions are shown in Table I:

TABLE I

| Ingredients | Ex. No. | Parts by Weight | | | | |
|---|---|---|---|---|---|---|
| | | 4 | 5 | 6 | 7 | 8 |
| Addition interpolymer salt of Example 1 | | 690.0 | — | — | — | — |
| Salt B | | — | 690.0 | — | — | — |
| Salt C | | — | — | 690.0 | — | — |
| Salt D | | — | — | — | 690.0 | — |
| Salt E | | — | — | — | — | 690.0 |
| Epon 834* | | 355.0 | 355.0 | 355.0 | 355.0 | 355.0 |
| $TiO_2$ | | 500.0 | 500.0 | 500.0 | 500.0 | 500.0 |
| Silica (amorphous) | | 200.0 | 200.0 | 200.0 | 200.0 | 200.0 |
| Propylene glycol monomethyl ether | | 88.0 | 88.0 | 88.0 | 88.0 | 88.0 |
| Dipropylene glycol monomethyl ether | | 90.0 | 90.0 | 90.0 | 90.0 | 90.0 |
| Igepal CO-897** | | 30.0 | 30.0 | 30.0 | 30.0 | 30.0 |
| Water | | 264.0 | 264.0 | 264.0 | 264.0 | 264.0 |

*An epoxy resin of epichlorohydrin-bisphenol A having an epoxide equivalent of about 230–280 and a Gardner-Holdt viscosity of O-V, available from Shell Chemical Company.
**Non-ionic surfactant, available from GAF Corporation.

The resultant compositions were evaluated for potlife by measuring the viscosities and observing the solubilities thereof at various time intervals. The viscosities were measured utilizing a Storner Viscometer. Test results are shown in Table II.

TABLE II

| Example Number | STORAGE TIME AT ROOM TEMPERATURE | | | | | | | |
|---|---|---|---|---|---|---|---|---|
| | 1 Hour | | 2 Hours | | 4 Hours | | 6 Hours | |
| | Viscosity* | Solubility | Viscosity | Solubility | Viscosity | Solubility | Viscosity | Solubility |
| 4 | 90 | OK | 90 | OK | 90 | OK | 93 | OK |
| 5 | —** | Insoluble | — | — | — | — | — | — |
| 6 | 143 | Water-dispersible | 143 | Water-dispersible | 143 | Water-dispersible | 143 | Water-dispersible |

TABLE II-continued

| Example Number | STORAGE TIME AT ROOM TEMPERATURE | | | | | | | |
|---|---|---|---|---|---|---|---|---|
| | 1 Hour | | 2 Hours | | 4 Hours | | 6 Hours | |
| | Viscosity* | Solubility | Viscosity | Solubility | Viscosity | Solubility | Viscosity | Solubility |
| 7 | 103 | OK | 105 | OK | 106 | OK | 110 | OK |
| 8 | 130 | Water-dispersible | 132 | Water-dispersible | 132 | Water-dispersible | 140 | Insoluble |

*Values reported are in Krebs units.
**Viscosity too high to measure - composition separated into two phases.

As shown by Table II, the composition of Example 4, in which the addition interpolymer salt was formed by neutralization with diethylethanolamine remained stable after 6 hours storage at room temperature, whereas the composition of Example 5, in which the addition interpolymer salt was formed by neutralization with pyridine, was unstable after only one hour, becoming insoluble and separating into two phases. The composition of Example 6, in which the addition interpolymer salt was formed by neutralization with N-ethyl morpholine, remained water-dispersible after 6 hours storage time at room temperature, whereas the composition of Example 8, in which the addition interpolymer salt was formed by neutralization with N-methyl morpholine, became insoluble after 6 hours storage time at room temperature.

It will be noted that the composition of Example 7, in which the addition interpolymer salt was formed by neutralization with N-methyl diethanolamine remained stable after 6 hours storage at room temperature. However, the composition does show an 8 point rise in Krebs units, indicating a tendency toward instability. As will be observed, N-methyl diethanolamine closely approaches the desired level of steric hindrance, as defined in the above formula.

In addition to the above potlife evaluation, an additional potlife comparison was performed in which a composition similar to the composition of Example 4 (addition interpolymer salt formed by neutralization with diethyl ethanolamine) was compared to basically the same composition except that the addition interpolymer salt was formed by neutralization with dimethylethanolamine. In this evaluation, the composition containing the addition interpolymer salt formed by neutralization with diethylethanolamine remained stable after 24 hours storage at room temperature whereas the composition containing the addition interpolymer salt formed by neutralization with dimethylethanolamine became unstable (i.e., separated into phases) after 2 hours storage at room temperature.

As indicated by foregoing evaluations, the polymeric compositions of the invention exhibit improved potlife and form cured products having excellent solvent resistance. In addition, the polymeric compositions of the invention form cured products having excellent stain resistance. Thus, the polymeric compositions herein form cured products having excellent resistance to staining by such materials as lipstick, coffee, magic marker pencils, ink, grease pencil, mustard and similar materials.

According to the provisions of the Patent Statutes, there are described above the invention and what are now believed to be its best embodiments. However, within the scope of the appended claims, it is to be understood that the invention can be practiced otherwise than as specifically described.

What is claimed is:

1. A two-package polymeric composition comprising cocurable resinous components which consist essentially of:
   (a) a polyepoxide having a 1,2-epoxy equivalence of greater than 1.0 and a molecular weight below about 4000; and
   (b) an addition interpolymer containing a polymeric backbone of at least two interpolymerized, ethylenicallyunsaturated monomers, at least one of which contains carboxyl groups, and pendent thereto:
      (1) anionic salt groups formed by reacting a part of said carboxyl groups with a sterically-hindered tertiary amine having the structure:

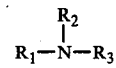

wherein $R_1$, $R_2$ and $R_3$ are each aliphatic or cycloaliphatic radicals having from 2 to 10 carbon atoms, and
      (2) amine groups formed by reacting a part of said carboxyl groups with an alkylenimine;
said components (a) and (b) being interreactive to form a crosslinked, hard material.

2. The composition of claim 1 wherein said resinous components consist essentially of from about 5 to about 95 percent by weight of component (a) and from about 95 to about 5 percent by weight of component (b).

3. The composition of claim 1 wherein said composition is thinnable or reducible with organic solvents, water or a mixture thereof.

4. The composition of claim 1 in which said hindered amine is diethylethanolamine.

5. A two-package polymeric coating composition, the film-forming vehicle components of which consist essentially of:
   (a) a polyepoxide having a 1,2-epoxy equivalence of greater than 1.0 and a molecular weight below about 4000; and
   (b) an addition interpolymer containing a polymeric backbone of at least one interpolymerized, ethylenically-unsaturated carboxyl group-containing monomer and at least one interpolymerized, ethylenically-unsaturated aminolysis resistant organic monomer, said polymeric backbone having pendent thereto:
      (1) anionic salt groups formed by reacting a part of said carboxyl groups with a sterically-hindered tertiary amine having the structure:

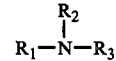

wherein $R_1$, $R_2$ and $R_3$ are each aliphatic or cycloaliphatic radicals having from 2 to 10 carbon atoms, (2) amine groups formed by reacting a part of said carboxyl groups with an alkylenimine, and (3) aminolysis resistant organic groups; said components (a) and (b) being interreactive to form a crosslinked, hard, solvent and stain resistant material.

6. The composition of claim 5 wherein said sterically-hindered tertiary amine is diethylethanolamine.

7. The composition of claim 5 wherein said film-forming components consist essentially of from about 5 to about 95 percent by weight of component (a) and from about 95 to about 5 percent by weight of component (b).

8. The composition of claim 5 in which said polyepoxide is a polyglycidyl ether of a polyphenol.

9. The composition of claim 5 in which either or both of components (a) and (b) are in a solvent medium composed predominantly of water.

10. The composition of claim 5 wherein the carboxyl groups of said interpolymer are derived from an alpha, beta-ethylenically unsaturated carboxylic acid.

11. The composition of claim 10 wherein said carboxylic acid is acrylic acid or methacrylic acid, or a mixture thereof.

12. The composition of claim 5 wherein said amine groups of said interpolymer are formed by reacting from about 15 mole percent to about 50 mole percent of said carboxyl groups with said alkylenimine.

13. The composition of claim 5 wherein said alkylenimine is propylenimine or ethylenimine or a mixture thereof.

14. The polymeric composition of claim 5 wherein said pendent aminolysis resistant organic groups of said interpolymer are formed from monoolefinic and diolefinic hydrocarbons, unsaturated substituted or unsubstituted carboxylic acid amides, or sterically-hindered branched chain or alicyclic esters of alpha, alkyl-substituted carboxylic acids or mixtures thereof.

15. The composition of claim 14 wherein said groups are formed from styrene, alpha-methyl styrene, vinyl toluene or a mixture thereof.

16. The polymeric composition of claim 14 wherein said groups are formed from isobutyl methacrylate, cyclohexyl methacrylate or a mixture thereof.

17. The composition of claim 1 wherein the ethylenically unsaturated monomer which contains carboxyl groups comprises from about 5 percent to about 60 percent of the addition interpolymer.

18. The composition of claim 17 wherein the alkylenimine is reacted with from about 5 mole percent to about 95 mole percent of the carboxyl groups.

19. The composition of claim 5 wherein the ethylenically unsaturated monomer which contains carboxyl groups comprises from about 5 percent to about 60 percent of the addition interpolymer.

20. The composition of claim 19 wherein the alkylenimine is reacted with from about 5 mole percent to about 95 mole percent of the carboxyl groups.

* * * * *